United States Patent

[11] 3,575,597

| [72] | Inventors | Hongsuk H. Kim<br>Bedford;<br>Shardanand, Cambridge, Mass. |
|---|---|---|
| [21] | Appl. No. | 811,892 |
| [22] | Filed | Apr. 1, 1969 |
| [45] | Patented | Apr. 20, 1971 |
| [73] | Assignee | The United States of America as represented by the Administrator of the National Aeronautics and Space Administration |

[54] A MULTICHANNEL PHOTOIONIZATION CHAMBER FOR ABSORPTION ANALYSIS
10 Claims, 2 Drawing Figs.

[52] U.S. Cl. .................................................. 250/43.5R
    250/83.6R, 324/33
[51] Int. Cl. .................................................. G01t 1/18
[50] Field of Search .......................................... 250/83.6,
    43.5; 313/7; 324/33

[56] References Cited
UNITED STATES PATENTS
2,531,144  11/1950  Manley ........................ 250/83.6
2,950,387  8/1960  Brubaker ...................... 324/33X Primary Examiner—James W. Lawrence
Assistant Examiner—A. L. Birch
Attorneys—John R. Manning, Garland T. McCoy, Howard J. Osborn and William H. King ABSTRACT: A multichannel photoionization chamber is disclosed for measuring absorption, photoionization yield and photoionization coefficients of gases. The chamber includes a plurality of ion collection plates which permit measurement of ion current ratios to determine whether the absorption cross section is independent of both pressure and path length; i.e., Beer's law is obeyed. Also disclosed are a plurality of pressure gauges for measuring chamber pressure at locations adjacent each of the collector plates. The pressure values corresponding to ion current maxima for each collector plate are used to determine the absorption cross section of the filling gas. Identical values of cross section calculated in this way are another indication that Beer's law is obeyed.

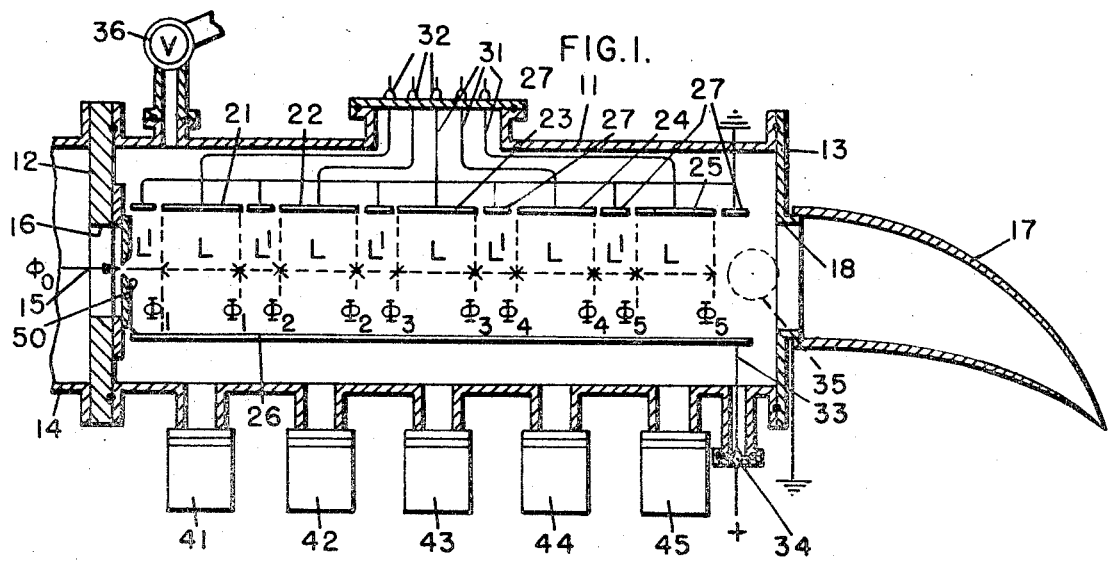
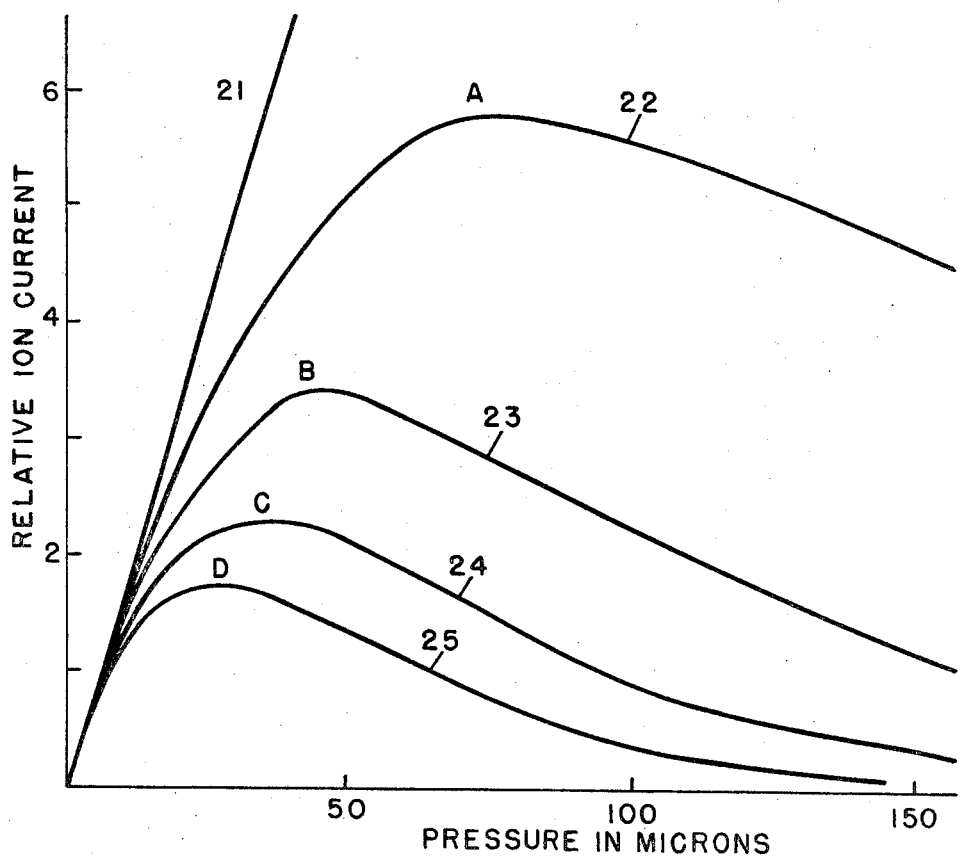

A MULTICHANNEL PHOTOIONIZATION CHAMBER FOR ABSORPTION ANALYSIS

ORIGIN OF THE INVENTION

The invention described herein was made by employees of the United States Government and may be manufactured and used by or for the government for governmental purposes without the payment of any royalties thereon or therefor.

BACKGROUND OF THE INVENTION

This invention relates generally to ionization chambers and, more particularly, relates to photoionization chambers for the measurement of absorption, photoionization yield and photoionization coefficients of gases.

Photoionization chambers have been widely used as detectors in the vacuum ultraviolet. They usually consist of one or two collector plates facing a common repeller plate. Also known is a single plate ion chamber for determining the ionization potentials of several gases. Two-plate ion chambers (henceforth called double ion chambers) have been used to measure photoionization yield, absorption, and photoionization coefficients, and the absolute intensity in the vacuum ultraviolet. For most applications in the spectral range above 1022A, ionization chambers are sealed permanently with a transparent solid window through which the radiation can pass. However, in the spectral range 1022A to 120A, all solids are opaque and, therefore, windowless ionization chambers have to be employed. In these windowless chambers the filling gas readily diffused through the window aperture and therefore must be replenished continuously from a gas reservoir. This procedure may result in a density gradient and in density fluctuations within the ionization chamber which are not measurable directly and may cause uncertainties in the measurements. To alleviate this difficulty of obtaining reproducible results many repetitive measurements must be made in a given pressure range with existing ionization chambers.

In order to determine such parameters as absolute photon yield of radiation sources or photoionization cross sections of gases with an ionization chamber detector, the absorption coefficient of the filling gas must be known accurately. Consequently, the accuracy of such a measurement depends on the accuracy of the value of the absorption coefficient used and, furthermore, Beer's law must be obeyed in the absorption path within the chamber. Beer's law will not be obeyed if the density gradient is appreciable.

The object of this invention, therefore, is to provide an improved ionization chamber that simplifies the measurement of absorption, photoionization yield and photoionization coefficients of gases.

SUMMARY OF THE INVENTION

The invention is characterized by the provision of an ionization chamber comprising a hollow housing for containing a test gas at reduced pressure and having an input end adapted to receive a beam of radiation from a monochromator. At least three collector plates are disposed within the housing and spaced apart in the direction of radiation transmission. By comparing the ratios of ion current collected by certain pairs of collector plates, it can be determined whether the absorption cross section within the housing is independent of both the pressure and the path length of the radiation.

An important feature of the invention is the provision of an ionization chamber of the above type including a plurality of pressure gauges for measuring the chamber pressure at distinct locations juxtaposed each of the collector plates. The pressure gauges are used to determine the pressures at which a maximum value of ion current is drawn by each of the collector plates. These pressure values are then used to calculate independently the absorption coefficient of the filling gas. If the calculated coefficients are identical, additional proof is provided that the absorption cross section within the chamber is independent of both pressure and path length.

Another feature of the invention is the provision of an ionization chamber of the above types including guard electrodes disposed between each of the collector plates and wherein the effective collection surface areas of all the collector plates are equal. The guard rings serve to electrically isolate the individual collector plates while the equal collection surface areas establish a uniform relationship between the measured parameters at the individual plates.

Another feature of the invention is the provision of an ionization chamber of the above types including a radiation trap mounted at the end of the housing opposite the input end. The radiation trap insures accurate ion current measurement at the nearest collector plate by eliminating the back scattering of photons.

Another feature of the invention is the provision of an ionization chamber of the above type including at least five individual collector plates. The use of at least five collector plates increases the number of possible data checks and thereby insures further the validity of the measurements made.

BRIEF DESCRIPTION OF THE DRAWINGS

These and other features and objects of the present invention will become more apparent upon a perusal of the following specification taken in conjunction with the accompanying drawings wherein:

FIG. 1 is a schematic cross-sectional view of a preferred ionization chamber embodiment of the invention; and FIG. 2 is a plot of ion current vs. pressure for each of the collector plates shown in FIG. 1.

DESCRIPTION OF THE PREFERRED EMBODIMENT

Referring now to FIG. 1 there is shown a cylindrical housing 11 having an input end closed by an end plate 12 and an output end closed by an end plate 13. Connected to the end plate 12 is a partially shown monochromator 14 that directs a beam 15 of ultraviolet radiation through an opening 16 in the end wall 12. A radiation beam 15 is transmitted along the longitudinal axis of the cylindrical housing 11 into a horn-shaped light trap 17 covering an aperture 18 in the end plate 13.

Disposed within the housing 11 and spaced apart along the longitudinal axis thereof are a plurality of ion collector plates 21—25 all having equal sized ion collection surfaces positioned parallel to a common repeller plate 26. A plurality of guard electrodes 27 are positioned between each pair of collector plates in the plurality of plates 21—25 and at opposite ends of the entire array. All of the guard plates 27 are electrically connected to the grounded housing 11.

Connected to the collector plates 21—25 are a plurality of electrical leads 31 that pass separately out of the housing 11 through a corresponding plurality of insulator feedthroughs 32 so as to permit independent measurement of the ion current collected by each collector plate. The repeller plate 26 is energized to a positive voltage by a lead 33 that enters the housing 11 through an insulator feedthrough 34. A pumping port 35 is located directly adjacent the output end of the housing 11 and is adapted for connection to a suitable vacuum pump (not shown). Communicating with the input end of the housing 11 is a variable leak valve 36 that permits establishment of a desired pressure within the housing 11. A plurality of pressure gauges 41—45 are connected for gas communication with adjoining chamber volumes including each of the collector plates 21—25.

During use, the ion chamber 11 is fitted with a brass plate having a centrally located adjustable slit 50 that restricts the outflow of gas from the chamber. This plate also serves as a part of the differential pumping system and is positioned between the exit slit of the monochromator 14 and the ion chamber 11. The other end of the ion chamber first accommodates a photomultiplier (not shown) to monitor the radiation. Once the monochromator 14 is calibrated in terms of wavelength vs. counter readings, the photomultiplier (not shown) is replaced by the horn-shaped light trap 17. If a simple blank.off flange is used in place of a light trap, there is an enhancement of ion current at the last collector plate 25. This effect is due to back scattering of photons by the flange and can introduce a significant error in the measurements.

As stated above, the accuracy of measurements utilizing an ion chamber depends on an accurate knowledge of the absorption cross section. The optimum conditions for accurately measuring the absorption cross section will now be considered.

As shown in FIG. 1, let L and L' be the length of each collector plate and the distance between successive plates, respectively. Let $\phi_m$ and $\phi_{m'}$, respectively, be the photon flux entering and leaving the $m$th plate, then, applying Lambert's law, $$\phi_m = \phi_0 \exp[-\sigma n\{mL' + (m-1)L\}] \quad (1)$$

$$\phi_{m'} = \phi_0 \exp[-\sigma n\{mL' + mL\}] \quad (2)$$

where $\phi_0$ is the flux at the entrance slit of the ion chamber. The photon flux absorbed over the path length L is given by $$\phi_m - \phi_{m'} = \phi_0 \exp[-\sigma n\{mL' + (m-1)L\}] \times [1 - \exp(-\sigma nL)], \quad (3)$$

where $\sigma$ is the absorption cross section, and $n$ is the number density of the gas, assumed to be the same throughout the length of the chamber. Let $\gamma$ be the photoionization yield of the gas, then, by definition, $$i_m/e = \gamma \phi_0 \exp[-\sigma n\{mL' + (m-1)L\}] \times [1 - \exp(-\sigma nL)], \quad (4)$$

where $i_m$ is the ion current measured at the $m$th collector plate, and $e$ is the electronic charge.

A plot of ion current $i_m$ vs. number density $n$, according to Eq. (4) passes through a maximum. The value of number density for which the current at the $m$th collector plate is a maximum is found by equating $di_m/dn$ to zero and is denoted by $n_{m,max}$. From the resulting expression we find, $$\sigma = (1/n_{m,max}L) \ln[(L' + L)/\{L' + (1 - 1/m)L\}] \quad (5)$$

It will be noted that Eq. (5) is independent of $i_m$; $n_{m,max}$ is the only variable quantity, all others are constant geometrical parameters. Therefore, in order to determine the value of $\sigma$, one only needs to know $n_{m,max}$. For this purpose one measures and plots $i_m$ as a function of gas pressure $p$ and obtains $p_{m,max}$, where $$P_{m,max} = P_0 n T / N_0 T_0$$

and $N_0 = 2.69 \times 10^{19}$ molecules/cc.,
$P_0 = 760$ torr,
$T_0 = 273.16°$ K.

The general behavior of the variation of ionization current $i_m$ with pressure is shown by the curves in FIG. 2. From these curves it is seen that $P_{m,max}$ is different for each plate 21—25, its value decreasing with increasing value of $m$. FIG. 2 shows maxima at points A, B, C and D for plates 22—24, respectively. The value of the cross section can be computed from Eq. (5), using any one of the values of $n_{m,max}$ obtained experimentally. If the values thus obtained are identical, then the absorption cross section is independent of both the pressure and the path length; i.e., Beer's law is obeyed.

It should be noted that the values of $n_{m,max}$ in FIG. 2 are related to the number density $n_{2,max}$ at the second collector plate 22 by $$n_{m,\,max.} = n_{2,\,max.} - \frac{1}{\sigma L} \ln \left| \frac{L' + (1 - 1/m)L}{L' + \frac{1}{2}L} \right| \quad (6)$$

Using Eq. (6), the experimentally determined values of $n_{m,max}$ may be cross-checked after $n_{2,max}$ has been calculated. Furthermore, from Eq. (4), it can be shown that $$\frac{i_1}{i_2} = \frac{i_2}{i_3} = \frac{i_3}{i_4} = \frac{i_4}{i_5} = \exp[\sigma n(L' + L)]$$

where $i_1, i_2, i_3, i_4$ and $i_5$ are the ion currents measured at collector plates 21 through 25, respectively. Expression (7) will hold for each set of observations provided the same attenuation law is obeyed throughout the ion chamber and is independent of pathlength. Therefore, the present invention provides an easy way to check the ratio of ion currents to successive collector plates for each observation, which is not possible with a double ionization chamber.

Obviously, may modifications and variations of the present invention are possible in light of the above teachings. It is to be understood, therefore, that the invention can be practiced otherwise than as specifically described.

We claim:

1. Multichannel ionization chamber apparatus comprising a hollow housing having an input end adapted to transmit a beam of radiation and an output end for receiving the beam of radiation, repeller plate means disposed in said housing, collector plate means comprising at least three collector plates, with the effective collection surface areas of all said collector plates being equal, disposed within said housing and spaced apart in a direction from said input end to said output end, guard electrodes disposed within said housing between each adjacent pair of said collector plates, pressure measurement means adapted to permit independent pressure measurements within said housing at distinct locations adjacent each of said collector plates, and separate collector leads connected to each of said collector plates and extending out of said housing so as to permit independent measurement of the ion current collected by each of said collector plates.

2. Multichannel ionization chamber apparatus according to claim 1 wherein said pressure measurement means comprises separate pressure gauges disposed to measure pressure at each of said distinct locations.

3. Multichannel ionization chamber apparatus comprising a hollow housing having an input end adapted to transmit a beam of radiation and an output end for receiving the beam of radiation, repeller plate means disposed in said housing, collector plate means comprising at least two collector plates disposed within said housing and spaced apart in a direction from said input end to said output end, separate collector leads connected to each of said collector plates and extending out of said housing so as to permit independent measurement of the ion current collected by each of said collector plates, and pressure measurement means adapted to permit independent pressure measurements within said housing at distinct locations adjacent each of said collector plates.

4. Multichannel ionization chamber apparatus according to claim 3 including guard electrodes disposed within said housing between each of said collector plates.

5. Multichannel ionization chamber apparatus according to claim 4 wherein the effective collection surface areas of all said collector plates are equal.

6. Multichannel ionization chamber apparatus according to claim 5 including radiation absorbing means located in said output end of said housing.

7. Multichannel ionization chamber apparatus according to claim 6 including pumping port means disposed adjacent said output end and adapted for connection with a vacuum pump, and a variable leak valve disposed adjacent said input end.

8. Multichannel ionization chamber apparatus according to claim 5 wherein said pressure measurement means comprises separate pressure gauges disposed to measure pressure at each of said distinct locations.

9. Multichannel ionization chamber apparatus according to claim 8 including pumping port means disposed adjacent said output end and adapted for connection with a vacuum pump, and a variable leak valve disposed adjacent said input end.

10. Multichannel ionization chamber apparatus according to claim 9 including radiation absorbing means located in said output end of said housing.